Patented Feb. 24, 1953

2,629,738

UNITED STATES PATENT OFFICE 2,629,738

N-BENZYL - ETHOXYNAPHTHYLPROPANOL-AMINES AND METHOD OF PRODUCING SAME

Merritt C. Fernald, Roanoke, Va., assignor to Carrol S. Loeb, New York, N. Y.

No Drawing. Application January 12, 1950, Serial No. 138,273

2 Claims. (Cl. 260—570.6)

1

This discovery relates to new compounds of the substituted naphthalene group and to a process for preparing them. More specifically it relates to new compounds of the general formula

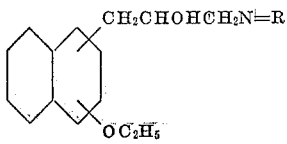

(wherein R=alky, dialkyl, aralkyl, piperidyl and morpholinyl) and to a process for making them.

I have shown earlier that substituted naphthalene compounds are very useful as local anesthetics and can be either injected under the skin or used for anesthetizing mucous membranes. They may be used instead of novocaine for injection in the form of $\frac{2}{10}$ percent aqueous solution of the hydrochloride, either with or without the addition of adrenalin. The object of this invention is to develop a new local anesthetic useful for topical use while minimizing its toxic effects. It is yet another object to develop a process for preparing these new local anesthetics. It is yet another object to develop an anesthetic of the substituted naphthalene type which is cheaper, more stable, colorless and yet one which will be water soluble in the form of the hydrochloride. Other objects will appear as this specification proceeds.

I have found that by substituting an alcoholic hydroxyl radical in the beta position of a γ-amino-propyl group which in turn is substituted in the No. 4 position of 1-ethoxy naphthalene, a new compound will be obtained which will fulfill the objects of this invention. Compounds of this type form hydrochlorides which are not hygroscopic, not foggy, and are water-white and colorless. They are water soluble and thus easily absorbed by mucous membrane. The compounds in base form are unstable, being easily oxidized, and are viscous oils. The hydrochloride form is a solid, extremely stable, and because of this newly-substituted alcoholic hydroxyl group they are of low toxicity.

PROCEDURE

The general method of preparation of the bases or compounds consists in making the Grignard reagent from the well-known brominated naphthalene derivative, namely 1-ethoxy-4-bromo-naphthalene, forming the γ-chloro-β-hydroxy-propyl derivative and subsequently condensing the γ-chloro-β-hydroxy-propyl derivative with the appropriate amino compound. The Grignard reagent may be converted either to the γ-bromo-β-hydroxy-propyl or the γ-iodo-β-hydroxy-propyl derivative, instead of the γ-chloro-β-hydroxy-propyl derivative. I prefer, however, to convert

2 the Grignard reagent to the γ-chloro-β-hydroxy-propyl derivative because of the ease of the reaction and the relative cheapness as compared to the γ-bromo-β-hydroxy-propyl and γ-iodo-β-hydroxy-propyl derivatives. The intermediate product appears to be new. A schematic representation of the general method of producing the compounds is:

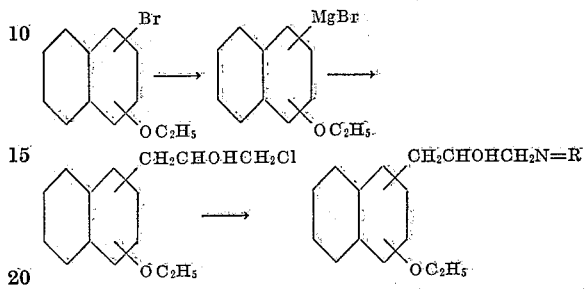

The following are given as specific examples of producing the compounds, but it is to be understood that the invention is not limited to the specific details given in these examples:

Example 1

Preparation of 1-ethoxy-4-(γ-diethyl-amino-β-hydroxy-propyl)-naphthalene

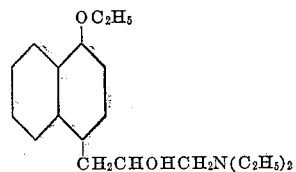

(a) 1-ethoxy-4-(γ-chloro-β-hydroxy-propyl)-naphthalene was prepared as follows: 100 cc. of dry ether were placed in a 500 cc. three-neck flask, which was fitted with a reflux condenser carrying a calcium chloride tube, a dropping funnel, and a mechanical stirrer; 5 grams of magnesium powder were then added to the ether, after having been activated by Baeyer's well-known method; about 5–10 cc. of freshly prepared methyl-magnesium-iodide and a few crystals of iodine were then added to the mixture in the flask, after the ether had been brought to a boil; 50 gms. of 1-ethoxy-4-bromo-naphthalene in 50 cc. of dry ether were than run in slowly through the dropping funnel. The reaction started when about half of the bromide had been added and proceeded vigorously. The flask was then cooled and 28 grams of epichlorohydrin (50% excess) dissolved in 50 cc. of cool dry ether were run in slowly and cautiously while stirring vigorously. The reaction mixture was then warmed on a water bath at about 50–60° C. for one hour. The addition product was then decomposed by the addition of water followed by dilute sulfuric acid. The ether layer was separated, dried over anhydrous sodium sulfate, and the chlorohydrin (which was a viscous yellow liquid) was purified by distillation in vacuo and fraction boiling at 178–186°/1 mm. was collected. The yield averaged 55%. The heavy yellow oil solidified on standing and was further purified by crystallization from petroleum ether in dull plates which melt at 82.5–84° C.

The chlorine calculated for $C_{15}H_{17}O_2Cl$ is 13.42% and the amount found in the product was 13.46% and 13.38%.

(b) 1 - ethoxy - 4 - ($\gamma$ - diethylamino - $\beta$ - hydroxy-propyl) naphthalene was prepared as follows: 26.5 grams of 1-ethoxy-4-($\gamma$-chloro-$\beta$-hydroxy-propyl)-naphthalene (.1 mol.) was placed in a pressure bottle together with 29.1 cc. of diethylamine (.3 mol.); the bottle was sealed and the mixture was heated at 75–80° C. for 10 hours. Upon cooling, the contents of the bottle were washed out with hydrochloric acid and water. The strongly acid solution was then extracted with ether in order to remove any unchanged chlorohydrin derivative. The solution was then made strongly alkaline and extracted with ether. The extracts from the alkaline solution were dried over anhydrous sodium sulfate. The amine distilled over as a golden yellow, viscous oil at 185–187°/½ mm. The yield was 76%.

(c) The hydrochloride of 1-ethoxy-4-($\gamma$-diethyl - amino - $\beta$ - hydroxy - propyl) - naphthalene was prepared by dissolving the free base in dry ether and dry hydrogen chloride was run in. A white precipitate was formed which was filtered off, washed with ether, and then recrystallized from acetone as white needles. The hydrochloride thus formed was readily soluble in water and melted at 164–165° C.

The nitrogen calculated for $C_{19}H_{28}O_2NCl$ is 4.15% and the amount found in the hydrochloride was 4.26%.

*Example 2*

(a) 1 - ethoxy - 4 - ($\gamma$ - piperidyl - $\beta$ - hydroxy - propyl) -naphthalene

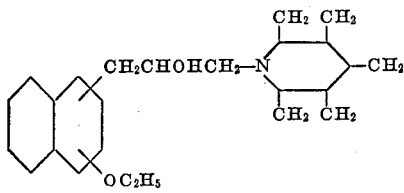

was prepared by a process similar to that outlined in Example 1.

13.2 g. of 1-ethoxy-4-($\gamma$-chloro-$\beta$-hydroxy-propyl)-naphthalene (.05 mol.), prepared precisely as described in Example 1, was placed in a pressure bottle together with 14.8 cc. of piperidine (.15 mol.); the bottle was sealed and the mixture was heated at 75–80° C. for 16 hours. Upon cooling the contents of the tube were washed out with hydrochloric acid and water. The strongly acid solution was then extracted with ether in order to remove any unchanged chlorohydrin derivative. The solution was then made strongly alkaline and extracted with ether. The extracts from the alkaline solution were dried over anhydrous sodium sulfate.

The amine distilled over as a golden yellow, viscous oil at 228–230°/3 mm. The yield was 40.9%.

(b) The hydrochloride of 1-ethoxy-4-($\gamma$-piperidyl-$\beta$-hydroxy-propyl)-naphthalene was prepared by dissolving the free base in dry ether and dry hydrogen chloride was run in. A white precipitate was formed which was filtered off, washed with ether, and then recrystallized from acetone as white needles. The hydrochloride thus formed was readily soluble in water and melted at 170–172° C.

The nitrogen calculated for $C_{20}H_{28}O_2NCl$ was 4.01 and the amount found in the hydrochloride was 4.06.

The following compounds are among those that can be obtained in accordance with this invention by following the procedures described in the preceding examples. It will be understood from the above description what brominated naphthalene derivative is to be used for the production of the respective compounds.

(1) 1 - ethoxy - 4 - ($\gamma$ - diethyl - amino - $\beta$ - hydroxy-propyl) -naphthalene

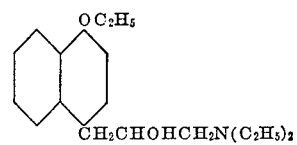

B. P. _____ 185–187°/½ mm.
M. P. hydrochloride _____ 164–165° C.
Calculated for $C_{19}H_{28}O_2NCl$:
    Nitrogen, theoretical _____ 4.15%
    Nitrogen, found _____ 4.26%

(2) 1 - ethoxy - 4 - ($\gamma$ - benzylamino - $\beta$ - hydroxy-propyl) -naphthalene

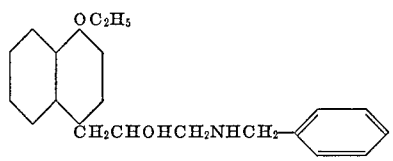

B. P. _____ 220–230°/2 mm.
M. P. hydrochloride _____ 170–172° C.
Calculated for $C_{22}H_{26}O_2NCl$:
    Nitrogen, theoretical _____ 3.77%
    Nitrogen, found _____ 4.00%

(3) 1 - ethoxy - 4 - ($\gamma$ - (3 - methyl - propylamino) -$\beta$-hydroxy-propyl) -naphthalene

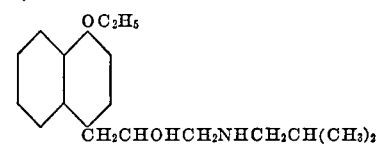

B. P. _____ 220–260°/1½ mm.
                            did not distill.
M. P. hydrochloride _____ 174–175° C.
Calculated for $C_{19}H_{28}O_2NCl$:
    Nitrogen, theoretical ____ 4.15%
    Nitrogen, found _____ 4.09%

(4) 1 - ethoxy - 4 - ($\gamma$ - piperidyl - $\beta$ - hydroxy - propyl) -naphthalene

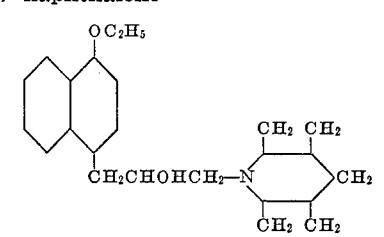

B. P. _____ 228–230°/3 mm.
M. P. hydrochloride _____ 182–183° C.
Calculated for $C_{20}H_{28}O_2NCl$:
    Nitrogen, theoretical _____ 4.01%
    Nitrogen, found _____ 4.06%

(5) 1 - ethoxy - 4 - (γ - morpholinyl - β - hydroxy-propyl) -naphthalene

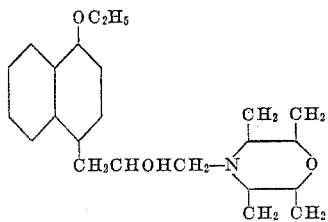

| | |
|---|---|
| B. P. | 250–260°/4 mm. |
| M. P. hydrochloride | 210–211° C. |

Calculated for $C_{19}H_{26}O_3NCl$:
    Nitrogen, theoretical _____ 3.98%
    Nitrogen, found _____ 4.00%

It is to be noted that the compounds forming this invention are the ethoxy substituted derivatives. Other alkoxy derivatives were prepared but the methoxy derivatives were found to be toxic and the alkoxy derivatives of the higher chain alkanes were found to have a lower activity than the ethoxy derivatives.

New compounds also possessing anesthetic properties which are derived from the above may be represented by the general formula

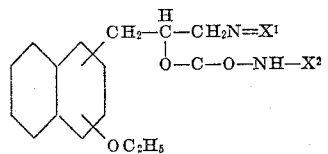

(where $X^1$ is alkyl, dialkyl, aralkyl, piperidyl, morpholinyl; $X^2$ is phenyl, naphthyl).

I claim:

1. A new compound having the structural formula

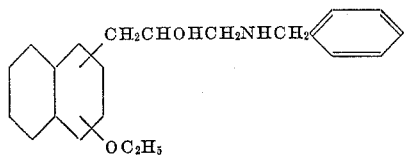

2. The process of producing a compound having the structural formula

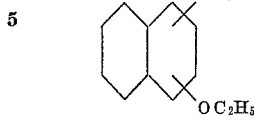

which comprises the steps of treating an ethoxy-bromonapthalene to form a Grignard reagent, having magnesium halide therein, reacting this reagent with an excess of epihalidohydrin to form an addition product, decomposing the addition product with weak acid to substitute thereon a β-hydroxy-γ-halido propyl group in the Grignard reagent in place of magnesium halide, and reacting the resulting compound with the

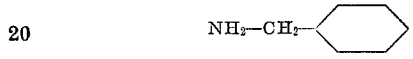

group.

MERRITT C. FERNALD.

REFERENCES CITED

The following references are of record in the file of this patent:

UNITED STATES PATENTS

| Number | Name | Date |
|---|---|---|
| 828,846 | Fourneau | Aug. 14, 1906 |
| 1,978,539 | Klarer et al. | Oct. 30, 1934 |
| 2,119,077 | Hill et al. | May 31, 1938 |

FOREIGN PATENTS

| Number | Country | Date |
|---|---|---|
| 24,631 of 1903 | Great Britain | Nov. 10, 1904 |

OTHER REFERENCES

Frankel: "Arzneimittel-Synthese," Edwards Bros., Inc., Ann Arbor, Michigan, 1944, page 536.